United States Patent [19]
Alexeev et al.

[11] 3,826,152
[45] July 30, 1974

[54] VARIABLE-RATIO GEAR TRANSMISSION

[76] Inventors: Kirill M. Alexeev; Antonina Alexeev, both of 415 E. 52nd St., New York, N.Y. 10022

[22] Filed: May 11, 1973

[21] Appl. No.: 359,530

[52] U.S. Cl. .............................................. 74/424.5
[51] Int. Cl. ............................................. F16h 1/18
[58] Field of Search .................................. 74/424.5

[56] References Cited
UNITED STATES PATENTS
| | | | |
|---|---|---|---|
| 2,697,365 | 12/1954 | Williams | 74/424.5 UX |
| 2,711,105 | 6/1955 | Williams | 74/424.5 UX |
| 3,422,702 | 1/1969 | Novinger | 74/424.5 X |

*Primary Examiner*—Leonard H. Gerin
*Attorney, Agent, or Firm*—Karl F. Ross; Herbert Dubno

[57] ABSTRACT

A toothed body of generally conical shape, on an output shaft, is engaged by one of two constantly meshing pinions whose mate slides on a driven input shaft. The teeth of the body form several axially adjoining zones which may be successive turns of a helicoidal spiral, or a succession of coaxial arcuate shoulders of progressively increasing diameter separated by eccentric ramps of intermediate curvature. The two pinions are mounted on a carriage, swingable about the input shaft, with the off-axial pinion biased into permanent engagement with the toothed body. At least in the case of a helicoidally spiraling track, a worm drive coupled with the output shaft causes a continuous axial displacement of the carriage during rotation of the input shaft to provide a substantially continuously changing transmission ratio.

10 Claims, 5 Drawing Figures

VARIABLE-RATIO GEAR TRANSMISSION

1. CROSS-REFERENCE TO RELATED APPLICATION

This application is related to copending application Ser. No. 229,675 filed 28 February 1972 by one of us, Kirill M. Alexeev, now U.S. Pat. No. 3,747,424.

2. FIELD OF THE INVENTION

Our present invention relates to a gear transmission for positively coupling an output shaft to an input shaft with a variable speed ratio.

3. BACKGROUND OF THE INVENTION

Conventional gear transmissions of this type comprise a stepped gear (or an equivalent set of gears) on one shaft, usually the output shaft, whose several steps are alternately engageable by a shiftable pinion on another shaft parallel thereto. The switchover from one speed ratio to the other requires the disengagement of the pinion from one set of gear teeth and its subsequent engagement with another set, the existing difference between the peripheral speeds of the two sets necessitating the decoupling of the driven shaft from its load (or of the driving shaft from its power source) to prevent gear clashing. The use of a clutch for such decoupling operation, e.g. as employed in standard automotive transmissions, is cumbersome and also prevents permanent synchronization of the load with the source.

In the prior application and patent identified above, there is disclosed a variable speed reducer which eliminates the need for a clutch through the coaction of a worm on the input shaft with a tapering elastomeric body on the output shaft, the worm being journaled in a carriage which is displaceable along the generatrix of the tapering body to vary the step-down ratio between the two shafts. Such a system is inherently suitable for the transmission of limited torque that will not overtax the elastic deformability of the tapering body.

4. OBJECTS OF THE INVENTION

The general object of our present invention is to provide a clutchless transmission system affording a wide range of speed ratios with continuous positive coupling between a drive motor or other power source and a load.

A more particular object is to provide a system which utilizes the basic principles of the above-identified application and patent for the transmission of large torques.

SUMMARY OF THE INVENTION

These objects are realized, pursuant to our present invention, by the replacement of the tapering elastomeric body of the earlier application and patent with a similarly shaped, i.e., generally conical, body provided with a tooth track divided into a plurality of axially adjoining zones of uniform tooth spacing and of progressively increasing diameter, the teeth of this body being in permanent engagement with those of a pinion which is swingable about an axis parallel to that of the body and is slidable along these axes for successive alignment with all the zones. To facilitate the switching of the pinion from one zone to the next, without loss of contact, the toothed zones are provided with transition points where the pinion can move smoothly from zone to zone. The permanent engagement of the swingable pinion and the toothed body is maintained by guide means such as a cam track. With the toothed body keyed or fixed to a first shaft and the swingable pinion similarly secured to a second shaft, a load coupled with either of these shafts is positively synchronized with a source of motive power driving the other shaft.

The operative coupling between the swingable pinion and the aforementioned second shaft may include a second pinion in permanent mesh therewith and keyed to that shaft, the two meshing pinions being provided with a common carriage pivotable about the same shaft.

A system of this nature can be designed to permit free selection of a variety of speed ratios or to change the speed ratio progressively and automatically during rotation of the positively interconnected shafts. The automatic shift control may be realized, in a manner generally similar to that disclosed in the prior application and patent, through a permanent or disconnectable coupling advantageously including a worm drive. Thus, one of the two shafts may be linked through such a worm drive with a nonrotatable extension of the other shaft which is thereby forced to shift axially, causing a relative displacement of the pinion carriage and the toothed body; the sense of rotation, and with it the direction of axial shifting, may then be reversed to return the carriage to its starting position. Means may be provided for permitting the preselection of different stop positions in which the coupling is disengaged so as to maintain a desired speed ratio. Such an automatic or semiautomatic system may be used, for example, in certain machining operations in which the load is a leadscrew for a tool holder including a cross-slide which is independently advanced at a constant speed to shape a workpiece on a lathe; it could also be utilized for the progressive adjustment of a varifocal optical objective at an accelerating or decelerating rate to provide a zoom effect.

The term "generally conical" encompasses bodies whose radius changes not progressively but in steps; even with continuous change, the generatrices of this body need not be exactly linear.

Especially where manual control is desired, the toothed track on this body may therefore consist of a succession of coaxial arcuate shoulders of monotonically varying radius interleaved with connecting ramps of intermediate curvature, each shoulder and adjoining ramp being tangent to a common plane parallel to the body and pinion axes at one of the aforementioned transition points. With the arcuate shoulders disposed coaxially, they resemble the steps of a conventional stepped gear; however, the intercalation of the toothed ramps between these gear steps allows the swingable pinion to shift from one gear step to the next at full speed as long as the shifting occurs at the instant when the transition point moves past the pinion, i.e., when the teeth of the gear step and the adjoining ramp are mutually aligned. To prevent any gear clashing due to attempted shifts at other times, the toothed zones may be separated by guard rails leaving gaps only at the transition points.

In a system with automatic and progressive shifting, as described above, the several track zones may be merged into a continuous helicoidal spiral.

6. BRIEF DESCRIPTION OF THE DRAWING

The above and other features of our invention will now be described in detail with reference to the accompanying drawing in which:

FIG. 1A is an end view of a toothed body included in that system;

7. SPECIFIC DESCRIPTION

Figure 1:
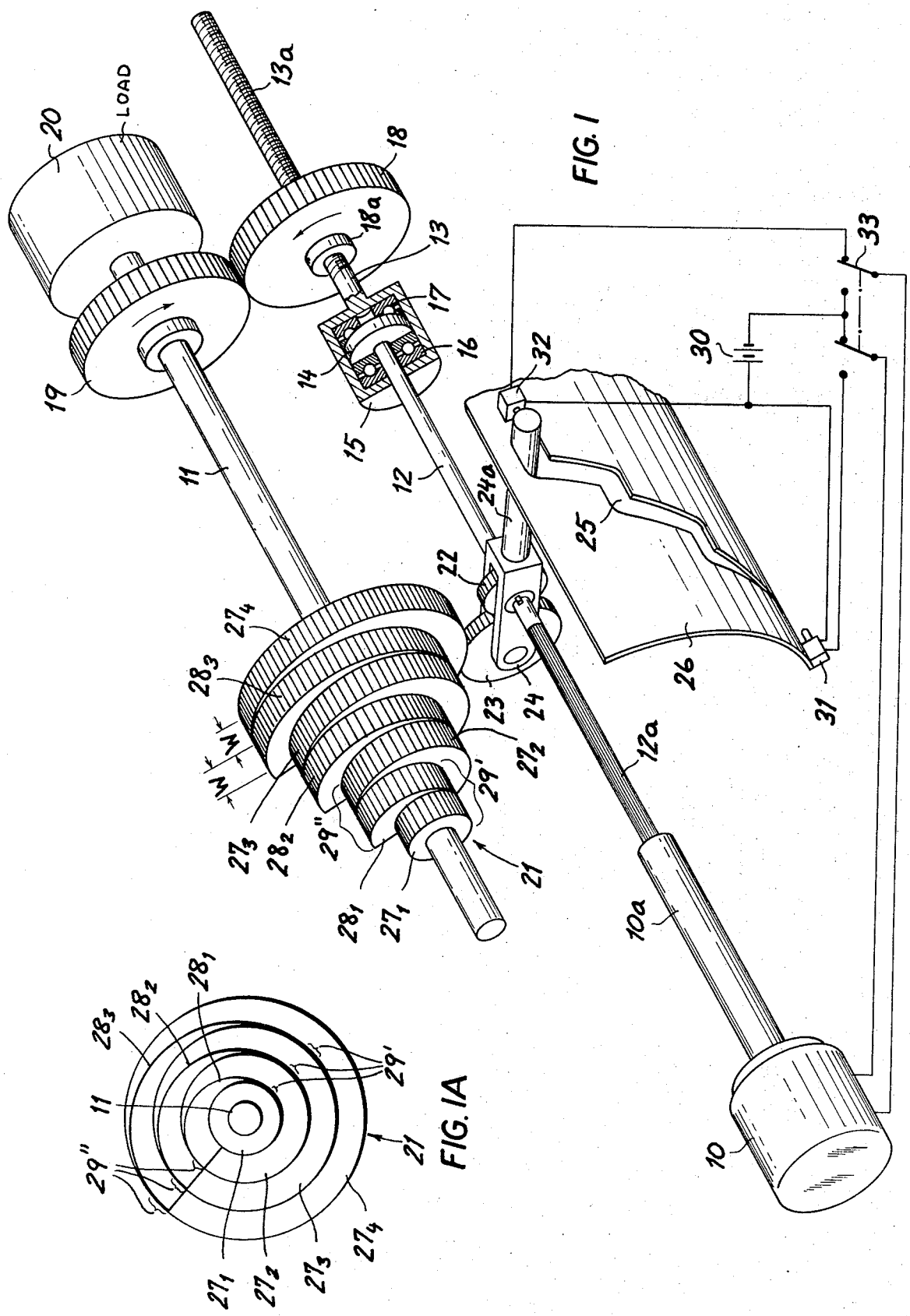
FIG. 1 is a somewhat diagrammatic perspective view of a system embodying our invention.

In FIG. 1 we have shown an embodiment of our invention including a first shaft 11, a second shaft 12 and an extension 13 of the latter. Shaft 12 is driven from a motor 10 via a telescopic linkage including a tubular power shaft 10a in sliding engagement with a splined portion 12a of shaft 12; at its opposite end this shaft terminates in a disk 14 within a cylindrical housing 15 integral with extension shaft 13. Thrust bearings 16, 17 within housing 15 enable relative rotation of shafts 12 and 13 while holding them linked for joint axial displacement. Shaft 13 has a screw-threaded portion 13a engaged by a complementarily threaded hub 18a of a gear 18 in mesh with a gear 19 which is rigid with shaft 11; gears 18 and 19 are held against relative axial displacement by means not shown. Shaft 11 is coupled to a load 20 to be driven in step with motor 10 but at a variable speed ratio with reference thereto.

A generally conical body 21 (see also FIG. 1A) is firmly seated on shaft 11 and has its toothed periphery permanently engaged by a pinion 23 meshing with another pinion 22 secured to shaft 12. The two pinions 22 and 23 are bracketed by a carriage 24 in the form of a bifurcate member integral with an arm 24a which is pivotally mounted on shaft 12 and is also held captive in a camming slot 25 of guide plate 26. Body 21 has a toothed periphery divided into a plurality of circular shoulders $27_1$, $27_2$, $27_3$, $27_4$, all centered on the axis of shaft 11, alternating with arcuate ramps $28_1$, $28_2$, $28_3$ whose centers are offset from the shaft axis and which extend over slightly more than 180°. Along a small arc segment, a few teeth of each ramp are aligned with teeth of the shoulder of smaller radius to the left thereof (as viewed in FIG. 1), thus forming a transition point 29', as particularly illustrated for shoulder $27_1$ and ramp $28_1$; at a diametrically opposite location, similarly, a few teeth of the ramp register with teeth of the shoulder of larger radius to the right thereof, thus forming a transition point 29" as particularly illustrated for ramp $28_1$ and shoulder $27_2$. The radius of each ramp is intermediate those of the two shoulders between which it is sandwiched.

Pinion 23, whose tooth spacing is the same as that of the zones $27_1$ - $27_4$ and $28_1$ - $28_3$, is somewhat narrower than these zones so as to be shiftable across the width w thereof, under the control of the worm drive constituted by gear hub 18a and threaded shaft portion 13a, in the course of half a revolution of shaft 11 and body 21. With the sense of rotation (as indicated by arrows) such that shafts 12, 13 and carriage 24 shift to the left (i.e., from the largest-diameter zone $27_4$ to the smallest diameter-zone $27_1$ of body 21), a rotation of 180° from the illustrated start position brings the pinion 23 into a position in which it overhangs the left-hand edge of zone $27_4$ at the transition point between this zone and the adjacent zone $28_3$.

As the pinion straddles the two toothed zones $28_3$ and $27_4$ at the transition point, a further leftward shift of carriage 24 moves it fully onto the ramp $27_3$ whose peripheral distance from the axis of shaft 11 ranges between the radius of shoulder $27_4$ and the radius of shoulder $27_3$. After another half-turn of shaft 11, the pinion 23 reaches the next transition point where it straddles the toothed zones $28_3$ and $27_3$, moving fully onto the latter during further rotation. In the same manner, the pinion successively engages the zones $28_2$, $27_2$, $28_1$ and $27_1$.

As the pinion meshes with the teeth of a ramp while slowly shifting axially thereover, its distance from the axis of shaft 11 changes in conformity therewith. This change is reflected in the illustrated stepped configuration of camming slot 25, which generally parallels the two shafts 11, 12, designed to hold the pinion 23 in contact with body 21.

The guide arm 24a of carriage 24 opens a limit switch 31, on arriving at the opposite end of its stroke, thereby arresting the motor 10 which under the aforedescribed conditions was energized from a d-c power supply 30 via a reversing switch 33. In the alternate position of switch 33, motor 10 is energized in the opposite sense to reverse the rotation of shafts 11 and 12 with consequent opposite displacement of carriage 24; another limit switch 32, engaged by arm 24a at the end of this return stroke, then again breaks the motor circuit.

Figure 2:
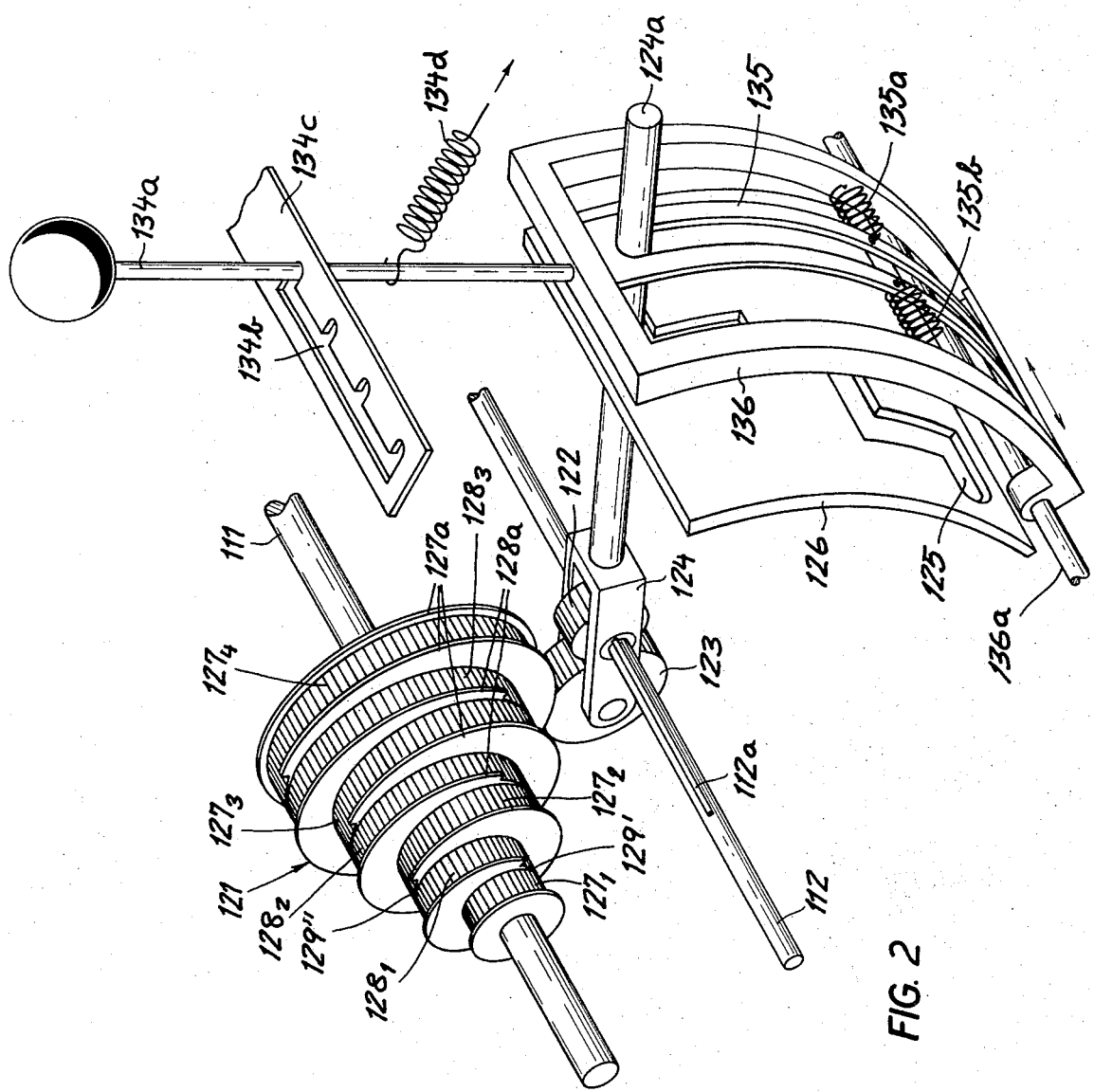
FIG. 2 is a similar view of a modification of that system.

In FIG. 2 we have shown a modification of the system of FIG. 1 designed for selective shifting, e.g. by hand, between any two speed ratios established by successive shoulders $127_1$ - $127_4$ on a generally conical toothed body 121 coacting with a pinion 123 in mesh with another pinion 122 on a carriage 124. An input shaft 112, which may be motor-driven like the shaft 12 of FIG. 1 but need not be axially slidable, has a keyed or splined portion 112a fitted into a hub of pinion 122 to facilitate axial sliding of carriage 124 along that shaft. Body 121 is mounted on an output shaft 111 which in this instance has no other driving connection with shaft 112. Coaxial toothed shoulders $127_1$ - $127_4$ are interleaved with toothed ramps $128_1$, $128_2$, $128_3$ in essentially the same manner as described for the toothed zones $27_1$ - $27_4$ and $28_1$ - $28_3$ of body 21 in FIG. 1. In this instance, however, all the zones extend along a full circle and are separated from one another by arcuate guard rails 127a, 128a which occupy nearly a full circle and form gaps 129', 129" at the aforedescribed transition points.

An arm 124a, integral with carriage 124, passes through a slotted slider 135 in a frame 136 which is slidably mounted on a guide rod 136a paralleling the shafts 111, 112. Springs 135a, 135b tend to center the slider 135 within frame 136, thereby forming a lost-motion coupling between arm 124a and a shift lever 134a rigid with frame 136. The shift lever is movable in a slot 134b of an indexing plate 134c whose notches determine the positions of alignment of pinion 123 with one of the coaxial zones $127_1$ - $127_4$; a spring 134d urges the lever 134b into any notch with which it has been manually aligned.

On an upshift initiated by a leftward displacement of lever 134a to a different notch, the guard rail 127a immediately to the left of pinion 123 will hold that pinion in line with its engaged shoulder (e.g. $127_4$) until the pinion registers with the corresponding gap 129'', at which point the slider 135 will move under the pressure of spring 135a to engage the pinion 123 with the adjoining ramp (e.g. $128_3$); a shifting beyond that ramp is, however, prevented at that instant by the corresponding guard rail 128a for another 180° until the pinion 123 clears the next transition point 129' for access to the following shoulder (e.g. $127_3$). In the case of a downshift (movement of lever 134a to the right), spring 135b plays an analogous role. Naturally, these springs 135a, 135b are representative of a group of such springs on either side of the slider 135.

Although, for the sake of clarity, the body 121 shown in FIG. 2 has only a relatively small number of toothed zones, it is to be understood that their number may be considerably increased and that, especially at its small end, successive gear steps ($127_1$, $127_2$ etc.) may differ by as little as one tooth in a limiting case.

Figure 3:
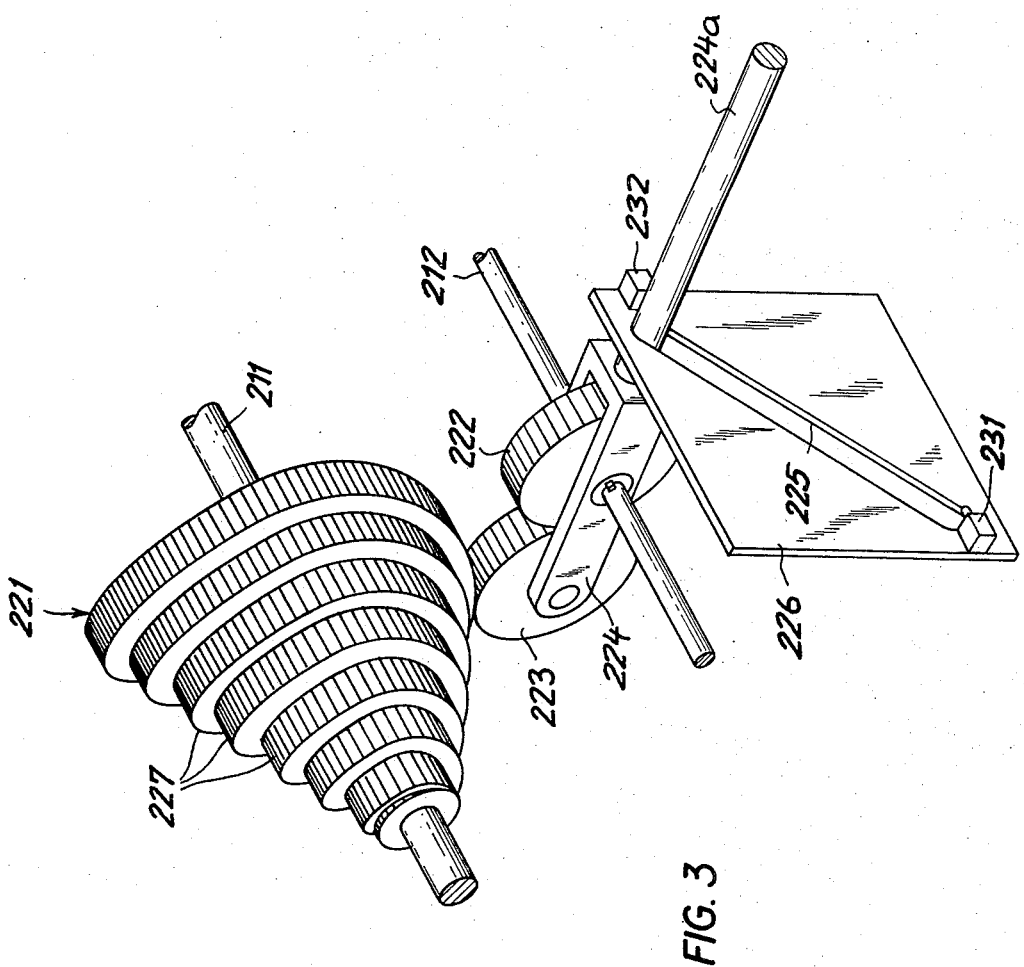
FIG. 3 is a fragmentary perspective view of a further embodiment.

FIG. 3 shows two shafts 211, 212 which are interconnected, in a manner not shown here but fully illustrated in FIG. 1, for a forced axial shift of shaft 212 and an associated carriage 224 with reference to a generally conical toothed body 221 on shaft 211 as long as this shaft rotates. Body 221 has a toothed peripheral track of helicoidally spiral configuration in permanent engagement with a pinion 223 on carriage 224 meshing with another pinion 222 fixed to shaft 212. An extension arm 224a of carriage 224 is engaged by a camming slot in a guide plate 226, this slot again extending generally parallel to the two shafts but at an angle to their axial plane designed to maintain the pinion 223 in mesh with the body 221 as the carriage 224 reciprocates axially at a speed commensurate with the pitch of the helicoid. The several turns 227 of the helicoid take the place of toothed zones $27_1$ - $27_4$, $28_1$ - $28_3$ or $127_1$ - $127_4$, $128_1$ - $128_3$ of the preceding Figures.

Since the step-down ratio of successive turns 227 changes proportionally to their radius and in turn causes a correspondingly changing rate of carriage shift, proper alignment of pinion 224 with the helicoidal track is assured if the pitch of that track is constant, i.e., if the spacing of corresponding points of its turns 227 in axial direction is the same throughout the length of the body 221. Any variation in that pitch would require a corresponding variation in the pitch of the threaded shaft portion (13a, FIG. 1) forming part of the worm coupling between the two shafts. Though shown flat for the sake of simplicity, plate 226 may be curved like plate 26 about the pivotal axis of the carriage.

Limit switches 232 and 232, alternately engageable by arm 224a, form part of a reversing circuit for the nonillustrated drive motor of shaft 212, analogous to that shown in FIG. 1.

Figure 4:
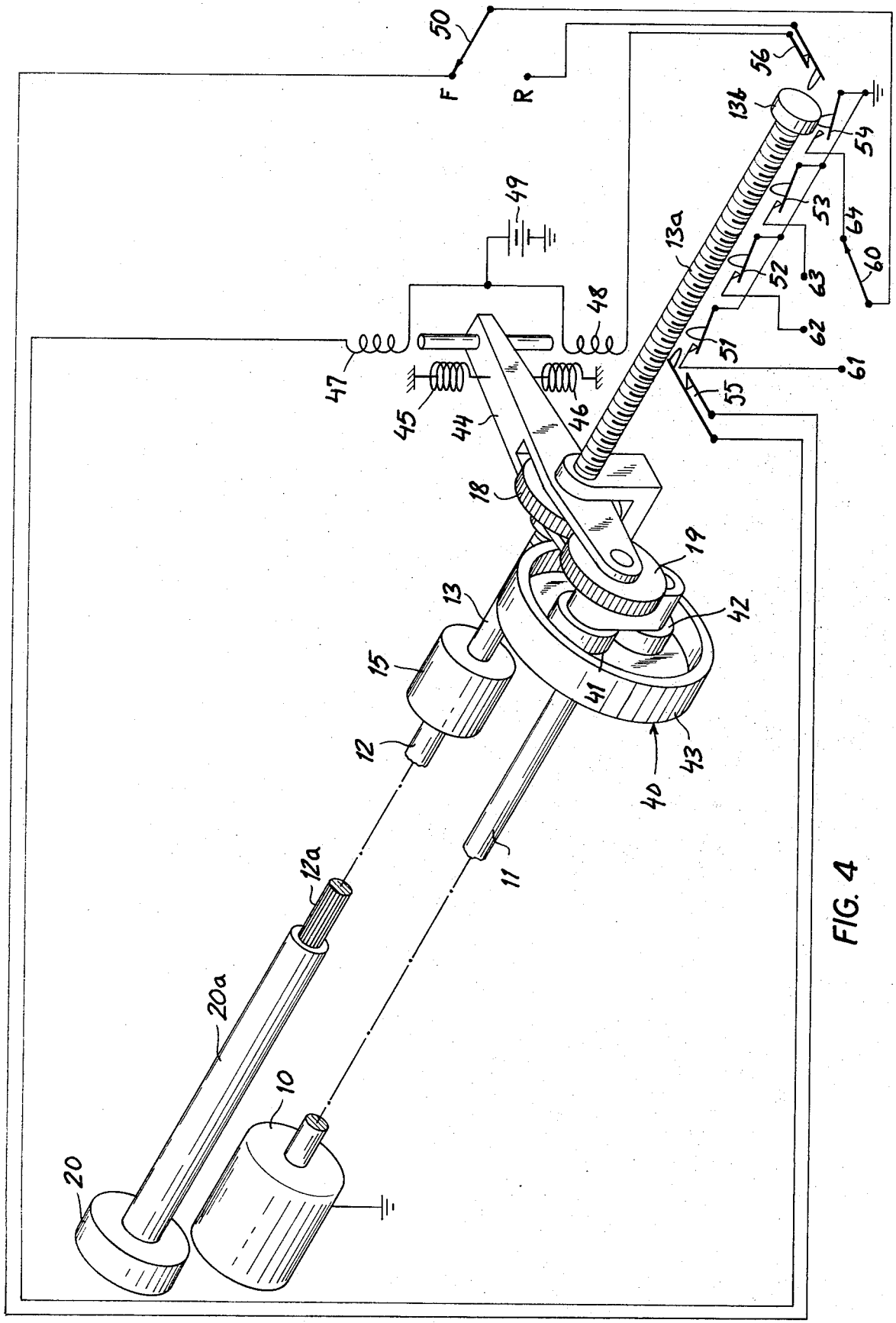
FIG. 4 is a partial perspective and schematic view of a modification of the system of FIG. 1.

Reference will now be made to FIG. 4 in which we have illustrated a system generally similar to that of FIG. 1, with omission — for the sake of clarity — of the toothed body 21 and the pinions 22, 23 on carriage 24. Also, the motor 10 has been connected with the nonextensible shaft 11 whereas the load 20 is rigid with a tubular shaft 20a engaging the splined end 12a of shaft 12. It will be understood that body 21 could be carried on either shaft 11, 12 with the carriage 24 mounted on the opposite shaft.

The gear coupling 18, 19 between the extension shaft 13 and shaft 11 has been supplemented by a reversible coupling 40 in tandem therewith. Coupling 40 includes a first friction roller 41 keyed to the shaft of gear 19, a second friction roller 42 in driving engagement with roller 41, and a ring 43 frictionally engageable by either of these rollers upon a swinging of a bifurcate gear holder 44 about shaft 13 on which it is pivoted. Two springs 45, 46 tend to keep the gear holder 44 in a neutral position in which neither of its rollers 41, 42 coacts with ring 43.

Motor 10 is assumed to operate only unidirectionally, upon being energized under the control of a nonillustrated switch, to drive the load 20 at a speed ratio determined by the relative axial position of carriage 24 and body 21 as described with reference to FIG. 1. A reversing switch with an arm 50 controls the energization of two solenoids 47, 48 from a grounded battery 49. Solenoid 47 tends to swing the gear holder 44 into a position in which roller 42 engages the ring 43 so as to be driven thereby in an upshifting sense causing movement of the shafts 12, 13 to the left; solenoid 48, when energized, brings the roller 41 into contact with ring 43 so as to reverse the axial displacement of these shafts (downshift). A collar 13b on extension shaft 13 is positioned to coact with a set of normally closed stop switches 51, 52, 53, 54 whose spacing along that shaft axis equals that of the annular zones $27_1$ - $27_4$ of body 21 (FIG. 1). Upon alignment of pinion 23 with shoulder $27_1$, collar 13b opens the switch 51; similarly, switches 52, 53 and 54 are opened when the pinion 23 confronts the shoulders $27_2$, $27_3$ and $27_4$, respectively. These four operating positions thus correspond to progressively lower speed ratios; they can be selectively established with the aid of a switch arm 60, in series with switch arm 50, sweeping four bank contacts 61, 62, 63, 64 respectively connected to fixed contacts of switches 51 – 54 whose movable armatures are grounded. Two limit switches 55, 56 are engageable by the collar 13b at the ends of its stroke, i.e., just beyond the positions in which switches 51 and 54 are respectively opened.

In the illustrated position of switch arms 50 and 60, the circuit of solenoid 47 including limit switch 55 is extended to switch 54 so that collar 13b, by opening switch 54, de-energizes that solenoid and decouples the motor-driven shaft 11 from gears 18, 19 whereby shafts 12 and 13 are axially immobilized; load 20 is therefore rotated at the lowest speed ratio as long as switch arms 50 and 60 remain in their illustrated position. If a higher speed ratio is desired, e.g. that established by the meshing of pinion 23 with toothed zone $27_3$, the operator moves the switch arm 60 onto the corresponding bank contact (63) whereupon collar 13b shifts to the left, together with shafts 12 and 13, until the associated stop switch (53) is tripped by it. If the operator then desires to re-establish the previous speed ratio, he returns the switch arm 60 to its position on bank contact 64 and moves the switch arm 50 from its forward position (F) to its reverse position (R) with consequent closure of an energizing circuit for solenoid 48 in series with limit switch 56. Shafts 12 and 13 then move to the right until collar 13b reopens the switch 54.

If the operator now mistakenly rotates the switch arm 60 onto one of its other bank contacts without moving switch arm 50 back to "forward" (F), shafts 12 and 13 shift a short distance to the right until limit switch 56 breaks the connection; in an analogous manner, limit switch 55 terminates the energization of solenoid 47 upon a shift of collar 13b to the left past the stop switch 51. An alarm device, not shown, could be actuated by these limit switches to alert the operator to the abnormal condition.

Thus, the system of FIG. 4 operates semiautomatically to establish a desired speed ratio. Switch 50 is preferably of the binary type having no intermediate positions in which the carriage shift might be accidentally arrested with the pinion 23 confronting one of the segmental ramps $28_1 - 28_3$ whereby the synchronization between shafts 11 and 12 could be lost.

We claim:

1. A variable-ratio gear transmission comprising:
   a generally conical body rotatable about a first axis, said body being provided with a toothed track divided into a plurality of axially adjoining zones of uniform tooth spacing and of progressively increasing diameter;
   a pinion swingable about a second axis parallel to said first axis and slidable along said axes for successive operative alignment with all said zones, the latter being provided with transition points for facilitating the switching of said pinion from one zone to the next;
   guide means permanently maintaining said pinion in positive engagement with the teeth of said body;
   a first shaft positively connected with said body;
   a second shaft positively coupled with said pinion;
   drive means connected with one of said shafts; and
   a load coupled with the other of said shafts.

2. A transmission as defined in claim 1, further comprising control means for axially shifting said pinion during rotation of said shafts by said drive means, thereby altering the transmission ratio effective between said shafts.

3. A transmission as defined in claim 2 wherein said zones are turns of a continuous helicoidal spiral.

4. A transmission as defined in claim 2, further comprising a second pinion permanently in mesh with said swingable pinion and secured to said second shaft for joint rotation therewith, said pinions being provided with a common carriage pivotable about said second shaft.

5. A transmission as defined in claim 4 wherein said control means comprises coupling means between said first shaft and said carriage for axially advancing the latter with reference to said body at a rate proportional to the rotary speed of said first shaft.

6. A transmission as defined in claim 5 wherein said coupling means comprises a nonrotatable extension of one of said shafts and a worm drive interconnecting said extension and the other of said shafts.

7. A transmission as defined in claim 5 wherein said coupling means is provided with switch means selectively trippable in several relative axial positions of said carriage and said body for halting the relative axial displacement thereof by deactivating said coupling means.

8. A transmission as defined in claim 1 wherein said zones are a succession of annular shoulders of monotonically varying radius alternating with ramps of intermediate curvature, each shoulder and adjoining ramp being tangent to a common plane parallel to said axes at one of said transition points.

9. A transmission as defined in claim 8, further comprising guard means separating said zones at locations other than said transition points.

10. A transmission as defined in claim 1, further comprising a swingable mount for said pinion, said guide means comprising a cam track extending generally parallel to said axes in engagement with said mount.

* * * * *